United States Patent
Ray

(10) Patent No.: US 6,667,479 B2
(45) Date of Patent: Dec. 23, 2003

(54) ADVANCED HIGH SPEED, MULTI-LEVEL UNCOOLED BOLOMETER AND METHOD FOR FABRICATING SAME

(75) Inventor: Michael Ray, Goleta, CA (US)

(73) Assignee: Raytheon Company, Lexington, MA (US)

(*) Notice: Subject to any disclaimer, the term of this patent is extended or adjusted under 35 U.S.C. 154(b) by 215 days.

(21) Appl. No.: 09/872,436

(22) Filed: Jun. 1, 2001

(65) Prior Publication Data

US 2002/0179837 A1 Dec. 5, 2002

(51) Int. Cl.[7] .................................................. G01J 5/00
(52) U.S. Cl. ................................... 250/338.1; 250/332
(58) Field of Search ........................... 250/338.1, 338.4, 250/332

(56) References Cited

U.S. PATENT DOCUMENTS

| | | | | |
|---|---|---|---|---|
| 6,034,374 A | * | 3/2000 | Kimura et al. | 250/370.08 |
| RE36,706 E | | 5/2000 | Cole | 250/349 |
| 6,144,030 A | | 11/2000 | Ray | |
| 6,144,285 A | * | 11/2000 | Higashi | 338/15 |
| 6,201,243 B1 | | 3/2001 | Jerominek | |
| 6,225,629 B1 | * | 5/2001 | Ju | 250/338.1 |
| 6,242,738 B1 | * | 6/2001 | Ju | 250/338.1 |
| 6,329,655 B1 | | 12/2001 | Jack et al. | 250/338.1 |
| 6,469,301 B1 | * | 10/2002 | Suzuki et al. | 250/338.1 |

\* cited by examiner

Primary Examiner—Constantine Hannaher
(74) Attorney, Agent, or Firm—William C. Schubert; Glenn H. Lenzen, Jr.

(57) ABSTRACT

A microbolometer unit cell (10) includes a substantially planar upper-level incident radiation absorption and detection structure (24), a substantially planar middle-level radiation reflection structure (26) spaced apart from the upper-level incident radiation absorption and detection structure for defining an optical resonant cavity (36) there between, and a substantially planar lower-level thermal isolation leg structure (20) spaced apart from the middle-level radiation reflection structure and electrically coupled to the upper-level incident radiation absorption and detection structure and to an underlying readout circuit. The lower-level thermal isolation leg structure is electrically coupled to the upper-level incident radiation absorption and detection structure through a leg (44) that passes through an aperture (48) within the middle-level radiation reflection structure, the leg also functioning as a structural support member. The lower-level thermal isolation leg structure is electrically coupled to the readout circuit through another leg (18) that terminates on an electrical contact (16) disposed on an underlying readout integrated circuit (12), and the middle-level radiation reflection structure is supported by an extension of the leg (18A).

20 Claims, 2 Drawing Sheets

ADVANCED HIGH SPEED, MULTI-LEVEL UNCOOLED BOLOMETER AND METHOD FOR FABRICATING SAME

TECHNICAL FIELD

These teachings relate generally to detectors of thermal energy and, more particularly, relate to uncooled bolometers that are responsive to Infrared Radiation (IR).

BACKGROUND

Miniature or microminiature bolometers are employed as detector pixel elements in two dimensional arrays of thermal (IR) detectors. The two dimensional array of bolometers converts the IR arriving from a scene of interest into electrical signals that are applied to a readout integrated circuit (ROIC). After amplification and desired signal shaping and processing, the resulting signals can be further processed as desired to provide an image of the scene of interest.

A microbolometer typically includes a polycrystalline semiconductor material, such as Vanadium oxide ($VO_x$) or Titanium oxide, having an electrical resistivity that varies as a function of temperature. An absorber of IR, such as SiN, is provided in intimate contact with the polycrystalline semiconductor material so that its temperature can be changed as the amount of IR arriving from the scene changes. Preferably, the polycrystalline semiconductor/absorber structure is thermally isolated from the underlying ROIC.

Reference with regard to microbolometers and techniques for fabricating same can be had to commonly assigned U.S. Pat. No. 6,144,030, issued Nov. 7, 2000, "Advanced Small Pixel High Fill Factor Uncooled Focal Plane Array", by Michael Ray et al., the disclosure of which is incorporated by reference herein in its entirety.

Another U.S. Patent of interest is U.S. Pat. No. 6,201,243 B1, issued Mar. 13, 2001, to Hubert Jerominek.

In general, as multi-level uncooled bolometer unit cell (pixel) sizes are reduced, and the performance requirements are increased, there arises a need to reduce the thermal mass of the bolometer units cells. One technique for accomplishing this is to reduce the component film thicknesses. However, this has the adverse effect of reducing the absorption of IR in the active detector areas, thereby reducing sensitivity. As the thicknesses of the constituent film layers is made thinner, there is a stronger reliance on a resonant cavity effect.

For example, and referring to FIG. 1 of the above-reference U.S. Pat. No. 6,144,030, there is an optical resonant cavity 22 formed between an IR absorptive structure 12, which includes a $VO_x$ semiconductor strip 14, and a thermally isolating structure 20 that includes a planar member 26 that also functions as a reflector.

In U.S. Pat. No. 6,201,243 B1 a mirror 3 is located on the substrate and is spaced apart from a microstructure 22, that contains the $VO_x$ thermistor, by one ¼ wavelength in the center of the IR spectral band of interest. This is said to gain resonant performance.

As can be appreciated, as the film thicknesses are reduced the overall structure tends to become less robust, thereby complicating the manufacture, handling and use of the microbolometer array. Reduced film thicknesses can also make the constituent layers more sensitive to intrinsic stresses, resulting in non-planarity or warping of the layers.

Furthermore, as film thicknesses are reduced, and more reliance is placed on the operation of the resonant optical cavity, it can be appreciated that the cavity construction should be optimized for its intended purpose. However, the placement of meander lines or other structures at a boundary of the cavity can impair its usefulness for its intended purpose.

SUMMARY OF THE PREFERRED EMBODIMENTS

The foregoing and other problems are overcome by methods and apparatus in accordance with embodiments of these teachings.

A microbolometer unit cell is constructed as a multi-level device having a lower-level thermal isolation structure and an upper-level structure containing an IR absorber/thermistor composite layer. The device further includes a middle-level reflector layer. An optical resonant cavity is formed between the reflector layer and the overlying absorber/thermistor composite layer, and the optical resonant cavity is physically, electrically and optically decoupled from the underlying thermal isolation structure. If desired, a stiffening member can be added to the absorber/thermistor composite layer, preferably in the form of an increased layer thickness at a periphery of the absorber/thermistor composite layer.

It is also within the scope of these teachings to make one subset of unit cells of the set of unit cells sensitive to one wavelength of IR, and to make at least one other subset sensitive to another wavelength of IR, thereby providing a two-color or a multi-color microbolometer array.

These teachings enable both the layer thicknesses and the unit cell center-to-center pitch to be reduced, as compared to prior art designs, thereby decreasing thermal mass and increasing the frequency response, but without degrading sensitivity, as the optical resonant cavity is improved over conventional approaches, and is optimized for its intended purpose.

A microbolometer unit cell includes a substantially planar upper-level incident radiation absorption and detection structure, a substantially planar, preferably stress-balanced, middle-level radiation reflection structure that is spaced apart from the upper-level incident radiation absorption and detection structure for defining an optical resonant cavity there between, and a substantially planar lower-level thermal isolation leg structure spaced apart from the middle-level radiation reflection structure and electrically coupled to the upper-level incident radiation absorption and detection structure and to an underlying readout circuit. The lower-level thermal isolation leg structure is electrically coupled to the upper-level incident radiation absorption and detection structure through a leg that passes through an aperture within the middle-level radiation reflection structure, the leg also functioning as a structural support member. The lower-level thermal isolation leg structure is electrically coupled to the readout circuit through another leg that terminates on an electrical contact disposed on an underlying readout integrated circuit, and the middle-level radiation reflection structure is supported by an extension of this leg. It is within the scope of these teachings that the upper-level incident radiation absorption and detection structure includes a stiffening member, such as one disposed frame-like about a periphery of the upper-level incident radiation absorption and detection structure.

The resonant optical cavity is defined by a spacing that is a function of the wavelength of the incident radiation, and an adjacently disposed unit cell of an array of unit cells may have a resonant optical cavity having a different spacing, thereby providing enhanced sensitivity to a different wavelength.

BRIEF DESCRIPTION OF THE DRAWINGS

The above set forth and other features of these teachings are made more apparent in the ensuing Detailed Description of the Preferred Embodiments when read in conjunction with the attached Drawings, wherein.

DETAILED DESCRIPTION OF THE PREFERRED EMBODIMENTS

Figure 1:
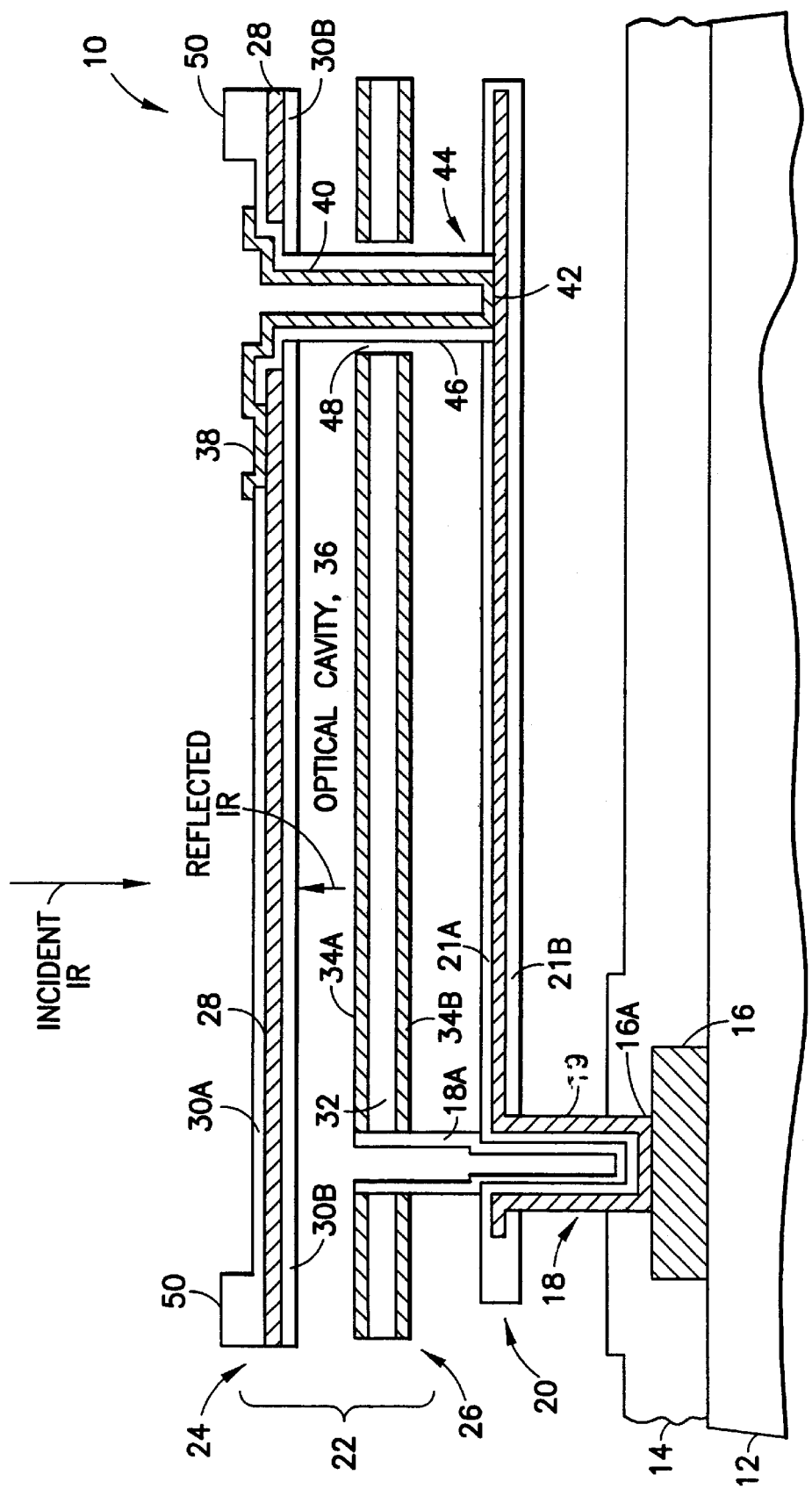
FIG. 1 is an enlarged cross-sectional view, not to scale, of a microbolometer unit cell in accordance with these teachings.
Figure 2:
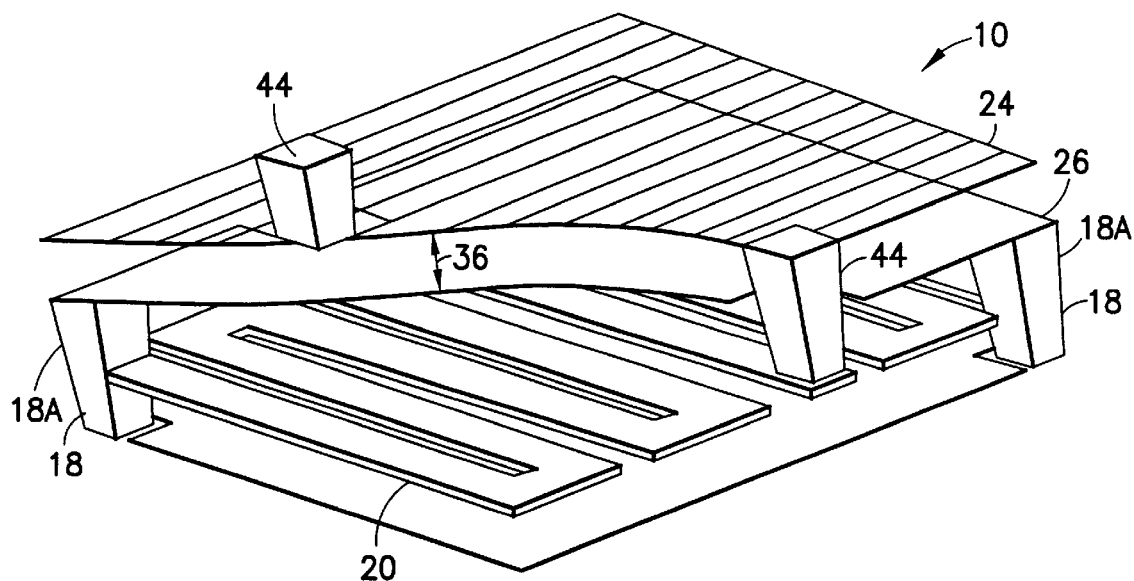
FIG. 2 is a simplified elevational view, partially in cut-away and transparent form, of the microbolometer unit cell.

Reference is made to FIG. 1 for showing an enlarged cross-sectional view, not to scale, of a microbolometer detector element or unit cell 10, in accordance with these teachings, and to FIG. 2 for showing a simplified elevational view of the microbolometer unit cell 10 of FIG. 1.

The microbolometer unit cell 10 is fabricated over a ROIC 12, which may be silicon, and which may have a planarized oxide ($SiO_2$) layer 14 disposed on an upper-most surface thereof A unit cell metal contact 16 is assumed to electrically connect the microbolometer to the ROIC electronics (not shown). A first upstanding leg 18 connects a substantially planar lower-level thermal isolation leg structure 20 to the contact 16 at junction 16A. As is best seen in FIG. 2, the lower-level thermal isolation leg structure 20 may have a serpentine shape, and meanders through the unit cell 10. The leg 18 may be considered to define the "thermally sunk" end of the lower-level thermal isolation leg structure 20. In a preferred embodiment the thermal isolation leg structure 20 is a SiN/NiCr/SiN composite, wherein a NiCr layer 19 is sandwiched between upper and lower silicon nitride (SiN) layers 21A and 21B, respectively.

In accordance with an aspect of these teachings, disposed above and spaced away from the lower-level thermal isolation leg structure 20 is an upper-level IR absorbing and detection layer/resonant cavity structure 22 that includes a substantially planar upper-level SiN/$VO_x$/SiN composite IR absorbing membrane 24 and an underlying substantially planar middle-level NiCr/SiN/NiCr composite reflector structure 26. The IR absorbing membrane 24 is constructed, in the presently preferred embodiment, of a $VO_x$ (or equivalent thermal resistivity material) layer 28 which functions as the active resistor or thermistor. The $VO_x$ thermistor layer 28 is sandwiched between upper and lower IR absorbing silicon nitride (SiN) layers 30A and 30B, respectively. The mid-level composite reflector structure 26 is constructed of a silicon nitride layer 32 sandwiched between upper and lower NiCr layers 34A and 34B, respectively, and is supported by a silicon nitride extension 18A to the first upstanding leg 18. The spacing between the NiCr layer 34A and the $VO_x$ layer 28/SiN layer 30B is nominally one quarter wavelength at the IR wavelength of interest, thereby forming a resonant optical cavity structure 36 for reflecting IR that passes unabsorbed through the IR absorbing membrane 24 back towards the IR absorbing membrane 24.

It is noted that the middle silicon nitride layer 32 basically functions as a structural support and substrate for the reflection layer 34A, and thus could be comprised of any suitable material. It is further noted that the lower-most NiCr layer 34B does not participate in reflecting the unabsorbed IR, and could in theory be eliminated. However, the presence of the lower NiCr layer 34B is desirable, as it tends to balance the intrinsic stress in the layers 32/34A, thereby inhibiting bending and warping of the mid-level composite reflector structure 26. If another material or metal system is selected for the reflection layer 34A, then preferably the lower layer 34B is selected to be the same or a similar material or metal system for achieving the desired stress balancing of the reflector structure 26.

An electrical contact 38 is formed to the $VO_x$ layer 28 with metalization 40, which also forms a contact 42 with the NiCr layer 19 of the lower-level thermal isolation leg structure 20. The metalization 40 is carried through a second upstanding leg structure 44, and is surrounded by a silicon nitride sleeve 46. The second leg structure 44 passes through a clear aperture made within the NiCr/SiN/NiCr composite reflector structure 26, and is thus structurally decoupled from the composite reflector structure 26.

In accordance with an aspect of these teachings, the optical resonant cavity 36 is improved over prior art approaches in that its lower reflective surface area is maximized, i.e., it can be fabricated to have a large and continuous surface since it is not carried by the meandering thermal isolation structure 20. In other words, by decoupling the mid-level composite reflector structure 26 from the lower-level thermal isolation leg structure 20, the construction of the reflector structure 26 can be optimized for its intended use. This improvement thereby enables the overlying IR absorbing membrane 24 to be thinned to improve its frequency response, without incurring a substantial decrease in sensitivity. For example, if conventional microbolometer devices employ 0.5 micron thick silicon nitride layers in the IR absorbing membrane portion, with a $VO_x$ layer of about 0.05 micron thickness, then the microbolometer 10 in accordance with these teachings may feature silicon nitride layers 30A, 30B having a thickness of 1000 Angstroms, or less, while the $VO_x$ layer may have a thickness in the range of about 300–500 Angstroms. The improved optical resonant cavity 36 also enables the area of each pixel to be reduced, thereby providing a denser array of IR sensors. For example, if conventional center-to-center unit cell spacings (pitch) are in the range of about 50 microns to about 25 microns, then the microbolometer unit cell center-to-center spacing may be reduced to be less than 25 microns, e.g., to about 15 microns or less. Relatedly, a reduction in unit cell area enables a plurality of smaller unit cells to be constructed within the area typically occupied by a conventional microbolometer unit cell. In this case, and if the conventional unit cell pitch happens to be adequate for a particular application, then a plurality of smaller unit cells may be constructed to be sensitive to different portions of the IR spectral band, thereby providing two-color or a multi-color detection capability within the area conventionally occupied by a single unit cell. The use of a plurality of smaller unit cells also provides other advantages, such as an ability to readily implement Non-Uniformity Correction (NUC) and other signal processing algorithms.

A further aspect of these teachings provides a stiffening member for use with the thinned IR absorbing membrane 24. In the presently preferred embodiment the stiffening member 50 is provided by a thickened periphery of the silicon nitride layer 30A of the absorbing membrane 24. The thickened periphery may be achieved during fabrication by masking the top surface of the layer 30A where the stiffening member 50 is desired, and then thinning the unmasked portion using, for example, a dry or wet etch. After thinning the layer 30A, the mask is removed, leaving the raised periphery, which may be thought of as a stiffening frame that surrounds the unit cell active area. A suitable width for the stiffening frame may be about 0.5 micron. In other embodiments one or more centrally disposed rib members could be formed in a similar manner, although the overall impact on the sensitivity of the microbolometer may be more pronounced.

It should be noted that the stiffening member 50 may be used whether the IR absorbing membrane 24 is thinned or not.

The reduction in detector thermal mass is not limited to thinning only the IR absorption membrane 24. For example, the lower-level thermal isolation leg structure 20 can be made thinner as well. For example, the silicon nitride layers 21A and 21B may have a total combined thickness in the range of about 1000 Angstroms to about 4000 Angstroms, and the buried NiCr layer may have a thickness from about 100 Angstroms to about 300 Angstroms. The width of the meander thermal isolation leg structure 20 may in the range of about 0.5 to about 0.75 microns. The middle-level NiCr/SiN/NiCr composite reflector structure 26 need not be thinned, and may employ, by example, a 0.5 micron thick layer of silicon nitride with 500 Angstrom thick NiCr metalization 34A and 34B.

Figure 3:
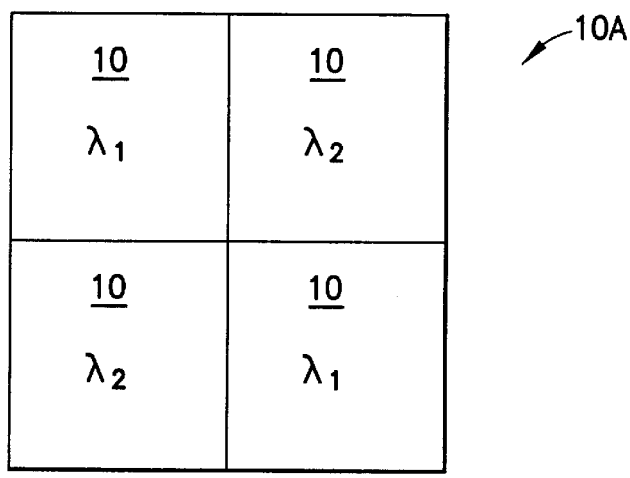
FIG. 3 is an enlarged top view of a unit cell that contains a plurality of microbolometer unit cells constructed in accordance with these teachings.

When optimized for use with long wavelength IR (LWIR) a suitable width of the optical resonant cavity 36 can be in the range of about 1.8 microns to about 2.0 microns. If optimized for use with mid-wavelength IR (MWIR) a suitable width of the optical resonant cavity 36 can be about 1.0 micron. When constructing a bi-color or a multi-color larger unit cell that contains a plurality of constituent, smaller unit cells, then the optical resonant cavity widths of adjacent smaller microbolometer unit cells 10 are adjusted accordingly. Reference in this regard can be had to FIG. 3, which shows a large unit cell 10A, e.g., one having dimensions equal to about twice the lateral dimensions of one smaller constituent microbolometer unit cell 10, and an area equal to about four times the area of one smaller constituent microbolometer unit cell 10. In the illustrated example two of the microbolometer units cells 10 are responsive to LWIR ($\lambda_1$), and two of the microbolometer units cells 10 are responsive to MWIR ($\lambda_2$) In other embodiments more or less than four microbolometer unit cells 10 may comprise the larger unit cell 10A, and more than two different IR wavelengths may be sensed. In this embodiment it is assumed that at least the spacing of the optical resonant cavity 36 is different between the MWIR-responsive and the LWIR-responsive microbolometer units cells, e.g., 1 micron versus about 1.9 microns, respectively.

In the illustrated structure a suitable spacing between layer 34B and layer 21A can be about 1.0 micron to about 2.0 microns, and a suitable spacing between layer 21B and the upper surface of the layer 14 can also be about 1.0 micron to about 2.0 microns.

The construction of the microbolometer unit cell 10 is preferably accomplished in accordance with conventional integrated circuit fabrication techniques, and may generally follow the procedure described in the above-referenced commonly assigned U.S. Pat. No. 6,144,030, with modifications being made to accommodate the aspects of these teachings described above. For example, while the microbolometer detector element of U.S. Pat. No. 6,144,030 employs a minimum of two sacrificial (polyimide) layers to establish the spacing between the silicon ROIC and the thermal isolation structure, and between the thermal isolation structure and the optically absorptive material structure, the microbolometer unit cell 10 in accordance with these teachings employs a minimum of three sacrificial layers: one to establish the spacing between the ROIC 12/oxide 14 and the lower-level thermal isolation leg structure 20; one to establish the spacing between the lower-level thermal isolation leg structure 20 and the mid-level composite reflector structure 26; and one to establish the spacing (i.e., the width of the optical cavity 36) between the mid-level composite reflector structure 26 and the upper-level IR absorbing membrane 24. Other modifications include the fabrication of the mid-level composite reflector structure 26 itself, and the associated leg extension 18A and aperture 48. If the stiffening member 50 is employed, then the fabrication of the top-most silicon nitride layer 30A can be modified as described above. If fabricating a multi-color array that is sensitive to two or more wavelengths, then the sacrificial layer (e.g., polyimide) that defines the optical resonant cavity 36 can be deposited to have a thickness equal to the widest desired cavity (e.g., 1.9 microns), followed by masking those unit cell areas where the widest cavity is desired, followed by selectively removing the sacrificial layer material in the unmasked unit cell areas to achieve the desired thickness (e.g., 1.0 micron). The selective removal of the sacrificial layer material can be done by dry plasma etching, or by any suitable technique. After achieving the desired thicknesses of the sacrificial layer material, processing continues by removing the mask and depositing in turn the SiN/VO$_x$/SiN multi-layered structure that forms the upper-most IR absorbing/thermistor membrane 24. Eventually, the three sacrificial layers are removed, such as by dry plasma etching, leaving the resulting structure shown in cross-section in FIG. 1.

The foregoing teachings have been described in the context of various dimensions, material types, wavelengths and the like, it can be appreciated that these are exemplary of the preferred embodiments, and are not intended to be read in a limiting matter upon the these teachings. For example, other types of IR absorber materials can be employed, besides silicon nitride, other types of metal systems can be used, besides NiCr, and other types of thermal resistors can be employed, other than VO$_x$. In other embodiments the microbolometer unit cells can be constructed to be responsive to wavelengths other than IR wavelengths.

Thus, while these teachings have been particularly shown and described with respect to preferred embodiments thereof, it will be understood by those skilled in the art that changes in form and details may be made therein without departing from the scope and spirit of these teachings.

What is claimed is:

1. A microbolometer unit cell, comprising:
    a substantially planar upper-level incident radiation absorption and detection structure;
    a substantially planar middle-level radiation reflection structure spaced apart from said upper-level incident radiation absorption and detection structure by an air gap that defines an optical resonant cavity between said middle-level radiation reflection structure and said upper-level incident radiation absorption and detection structure; and
    a substantially planar lower-level thermal isolation leg structure spaced apart from said middle-level radiation reflection structure by an air gap and electrically coupled to said upper-level incident radiation absorption and detection structure and to an underlying readout circuit.

2. A microbolometer unit cell as in claim 1, wherein said lower-level thermal isolation leg structure is comprised of a multi-layered electrical dielectric, electrical conductor, electrical dielectric composite structure.

3. A microbolometer unit cell as in claim 1, wherein said lower-level thermal isolation leg structure is comprised of a multi-layered SiN/NiCr/SiN composite structure.

4. A microbolometer unit cell as in claim 1, wherein said upper-level radiation absorption and detection structure is comprised of a multi-layered radiation absorption, thermally responsive electrical resistance, radiation absorption composite structure.

5. A microbolometer unit cell as in claim 1, wherein said upper-level radiation absorption and detection structure is comprised of a multi-layered SiN/VO$_x$/SiN composite structure.

6. A microbolometer unit cell as in claim 1, wherein said middle-level radiation reflection structure is comprised of a multi-layered structure having a radiation reflection layer supported by a substrate layer.

7. A microbolometer unit cell as in claim 1, wherein said middle-level radiation reflection structure is comprised of a multi-layered structure having a radiation reflection layer supported by a substrate layer, and is stress balanced by a further layer, comprised of the same material that forms said radiation reflection layer, that underlies said substrate layer.

8. A microbolometer unit cell as in claim 1, wherein said middle-level radiation reflection structure is comprised of a multi-layered NiCr/SiN/NiCr structure.

9. A microbolometer unit cell as in claim 1, wherein said upper-level incident radiation absorption and detection structure further comprises a stiffening member.

10. A microbolometer unit cell as in claim 9, wherein said stiffening member is disposed about a periphery of said upper-level incident radiation absorption and detection structure.

11. A microbolometer unit cell as in claim 1, wherein said resonant optical cavity is defined by a spacing that is a function of a wavelength of said incident radiation, and wherein an adjacently disposed unit cell of an array of unit cells comprises a resonant optical cavity having a different spacing.

12. A microbolometer unit cell as in claim 1, wherein said microbolometer unit cell comprises a part of an array of microbolometer unit cells, wherein a center-to-center spacing between adjacent microbolometer unit cells is less than 25 microns.

13. A microbolometer unit cell as in claim 1, wherein said microbolometer unit cell comprises a part of an array of microbolometer unit cells, wherein a center-to-center spacing between adjacent microbolometer unit cells is less than 20 microns.

14. A microbolometer unit cell as in claim 1, wherein a total thickness of said upper-level incident radiation absorption and detection structure is equal to or less than about 2500 Angstroms.

15. A microbolometer unit cell, comprising:
a substantially planar upper-level incident radiation absorption and detection structure;
a substantially planar middle-level radiation reflection structure spaced apart from said upper-level incident radiation absorption and detection structure for defining an optical resonant cavity there between; and
a substantially planar lower-level thermal isolation leg structure spaced apart from said middle-level radiation reflection structure and electrically coupled to said upper-level incident radiation absorption and detection structure and to an underlying readout circuit;
wherein said lower-level thermal isolation leg structure is electrically coupled to said upper-level incident radiation absorption and detection structure through a leg that comprises an electrical conductor that passes through an aperture within said middle-level radiation reflection structure.

16. A microbolometer unit cell, comprising:
a substantially planar upper-level incident radiation absorption and detection structure;
a substantially planar middle-level radiation reflection structure spaced apart from said upper-level incident radiation absorption and detection structure for defining an optical resonant cavity there between; and
a substantially planar lower-level thermal isolation leg structure spaced apart from said middle-level radiation reflection structure and electrically coupled to said upper-level incident radiation absorption and detection structure and to an underlying readout circuit;
wherein said upper-level incident radiation absorption and detection structure is supported by a leg that passes through an aperture within said middle-level radiation reflection structure and that terminates upon said lower-level thermal isolation leg structure.

17. A microbolometer unit cell, comprising:
a substantially planar upper-level incident radiation absorption and detection structure;
a substantially planar middle-level radiation reflection structure spaced apart from said upper-level incident radiation absorption and detection structure for defining an optical resonant cavity there between; and
a substantially planar lower-level thermal isolation leg structure spaced apart from said middle-level radiation reflection structure and electrically coupled to said upper-level incident radiation absorption and detection structure and to an underlying readout circuit;
wherein said lower-level thermal isolation leg structure is electrically coupled to said readout circuit through a leg that terminates on an electrical contact disposed on an underlying readout integrated circuit, and wherein said middle-level radiation reflection structure is supported by an extension of said leg.

18. A method for fabricating a microbolometer unit cell, comprising:
depositing a first sacrificial layer above a surface of a readout circuit;
depositing a plurality of first layers upon the first sacrificial layer for defining a lower-level thermal isolation leg structure;
depositing a second sacrificial layer over the first plurality of layers;
depositing a plurality of second layers upon the second sacrificial layer for defining a middle-level radiation reflection structure;
depositing a third sacrificial layer over the second plurality of layers;
depositing a plurality of third layers upon the third sacrificial layer for defining an upper-level incident radiation absorption and detection structure, wherein the thickness of the third sacrificial layer corresponds to a spacing of an optical resonant cavity to be formed between the middle-level radiation reflection structure and the upper-level incident radiation absorption and detection structure; and removing the first, second and third sacrificial layers.

19. A method as in claim 18, wherein the deposition of the plurality of third layers includes forming a stiffening member for the upper-level incident radiation absorption and detection structure.

20. A method as in claim 18, and further comprising electrically connecting a thermistor layer of the third plurality of layers to an electrically conductive layer of the first plurality of layers with an electrically conductive via that passes through an aperture made through the plurality of second layers.

* * * * *